United States Patent
Hotta et al.

(10) Patent No.: US 8,525,696 B2
(45) Date of Patent: Sep. 3, 2013

(54) VEHICLE-MOUNTED DEVICE AND AUDIO REPRODUCTION METHOD

(75) Inventors: Nobuyuki Hotta, Hachiouji (JP); Kouji Kuga, Sagamihara (JP); Hideo Shimoshimano, Hachiouji (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 605 days.

(21) Appl. No.: 12/682,345

(22) PCT Filed: Oct. 10, 2008

(86) PCT No.: PCT/JP2008/068454
§ 371 (c)(1),
(2), (4) Date: Apr. 9, 2010

(87) PCT Pub. No.: WO2009/048135
PCT Pub. Date: Apr. 16, 2009

(65) Prior Publication Data
US 2010/0214125 A1 Aug. 26, 2010

(30) Foreign Application Priority Data

Oct. 12, 2007 (JP) ................................ 2007-266785

(51) Int. Cl.
*G08G 1/16* (2006.01)
(52) U.S. Cl.
USPC ............................ 340/903; 340/439; 340/575
(58) Field of Classification Search
USPC ................. 340/903, 439, 438, 575–576, 479, 340/904–907, 901–902
See application file for complete search history.

(56) References Cited

U.S. PATENT DOCUMENTS

| 5,835,008 A * | 11/1998 | Colemere, Jr. ................ 340/439 |
| 6,892,942 B1 * | 5/2005 | Widl et al. ..................... 235/384 |
| 7,480,546 B2 * | 1/2009 | Kamdar et al. ................... 701/1 |
| 7,532,859 B2 * | 5/2009 | Videtich ...................... 455/12.1 |
| 2003/0225512 A1 * | 12/2003 | Kim et al. ...................... 701/209 |
| 2004/0192263 A1 * | 9/2004 | Tomikawa et al. ............. 455/413 |
| 2006/0161340 A1 * | 7/2006 | Lee .............................. 701/207 |
| 2007/0043698 A1 * | 2/2007 | Short et al. ........................ 707/2 |

FOREIGN PATENT DOCUMENTS

| JP | 2002-015342 | 1/2002 |
| JP | 2004-109143 | 4/2004 |
| JP | 2006-038740 | 2/2006 |

OTHER PUBLICATIONS

International Preliminary Report on Patentability (Application No. PCT/JP2008/068454) dated May 20, 2010.
International Search Report for PCT/JP2008/068454 dated Jan. 13, 2009.
Office Action (Application No. 2007-266785) dated May 15, 2012.

* cited by examiner

*Primary Examiner* — Daniel Previl
(74) *Attorney, Agent, or Firm* — Eric J. Robinson; Robinson Intellectual Property Law Office, P.C.

(57) ABSTRACT

Upon reception of content information (step S1), a control unit decides a different notification sound in accordance with an identifier attached to the received content information (step S4). The control unit causes a reproduction unit (5) to reproduce the decided notification sound. Thus, the user can guess the content of the received content information.

9 Claims, 11 Drawing Sheets

| IDENTIFIER | |
|---|---|
| CONTENT | TEXT INFORMATION |
| | IMAGE INFORMATION |
| | READ-OUT INFORMATION (TTS) |
| ENTERPRISER | ENTERPRISER CODE |
| | . . . |
| INFORMATION PROVIDER | INFORMATION PROVIDING COMPANY CODE |
| | . . . |
| REPRODUCTION CONDITION | PROMPT/ACCUMULATION |
| SCHEDULED REPRODUCTION POINT | COORDINATES (LATITUDE, LONGITUDE) |
| | INFORMATION PROVISION START POSITION (AREA CENTER COORDINATES, AREA RADIUS, TRAVELING DIRECTION) |
| | . . . |
| EVENT | TRAFFIC REGULATION INFORMATION, DISASTER REGULATION INFORMATION, CONGESTION INFORMATION, TRAVEL TIME INFORMATION, WEATHER INFORMATION, SA/PA INFORMATION, CAR PARK INFORMATION, FACILITY INFORMATION, ROUTE GUIDE INFORMATION, EVENTS INFORMATION, OTHER INFORMATION... |
| PRECEDENCE | PRECEDENCE (TOP PRIORITY, PRIORITY, OPTIONAL) |
| . . . | . . . |

| IDENTIFICATION NUMBER | EVENT | NOTIFICATION SOUND |
|---|---|---|
| EVENT 1 | TRAFFIC REGULATION | NOTIFICATION SOUND A1 |
| EVENT 2 | DISASTER REGULATION | NOTIFICATION SOUND A2 |
| EVENT 3 | CONGESTION | NOTIFICATION SOUND A3 |
| . . . | . . . | . . . |
| EVENT N | OTHER | NOTIFICATION SOUND AN |
| IDENTIFICATION NUMBER | CHARACTER STRING | NOTIFICATION SOUND |
| CHARACTER STRING 1 | FALLING ROCKS | NOTIFICATION SOUND B1 |
| CHARACTER STRING 2 | SHARP CURVE | NOTIFICATION SOUND B2 |
| CHARACTER STRING 3 | CAUTION | NOTIFICATION SOUND B3 |
| . . . | . . . | . . . |
| CHARACTER STRING N | . . . | NOTIFICATION SOUND BN |

VEHICLE-MOUNTED DEVICE AND AUDIO REPRODUCTION METHOD

TECHNICAL FIELD

The present invention relates to vehicle-mounted device and an audio reproduction method.

BACKGROUND ART

Conventionally, vehicle-mounted device such as a navigation apparatus performs dedicated short range communication with a roadside apparatus installed on a road by utilizing DSRC (Dedicated Short Range Communication) or the like. The vehicle-mounted device can receive information provided by a center apparatus through the roadside apparatus. More specifically, two-way communication between the vehicle-mounted device of the vehicle and the roadside apparatus is possible only while the vehicle is within a communication range of the roadside apparatus. During this period the center apparatus distributes various kinds of content information such as advertising information through the roadside apparatus.

In some cases, emergency information such as accident or disaster information is included in the content information. Since it is necessary to sufficiently attract the attention of the user to the emergency information, conventional vehicle-mounted devices output a warning sound upon receiving emergency information. For example, some vehicle-mounted devices determine the existence of a dangerous object using a sensor, and make a warning announcement to that effect (for example, see Patent Document 1). There are also vehicle-mounted devices that output a warning sound (buzzer sound, music, voice, or the like) upon receiving an emergency radio wave (for example, see Patent Document 2), and vehicle-mounted devices that lower the brightness of a display unit upon determining that emergency information is contained amongst a plurality of kinds of information (for example, see Patent Document 3).

According to the method disclosed in Patent Document 1, the reproduction time of a warning announcement is shortened or the output switches to a buzzer sound depending on the degree of urgency. According to the method disclosed in Patent Document 3, the brightness is changed according to the degree of urgency. It is thereby possible for the user to determine the degree of urgency of emergency information.
Patent Document 1: Japanese Patent Application Laid-Open No. 2006-107148
Patent Document 2: Japanese Patent Application Laid-Open No. 2003-132494
Patent Document 3: Japanese Patent Application Laid-Open No. H11-120491

DISCLOSURE OF THE INVENTION

Problems to be Solved by the Invention

However, content information that is received from a center apparatus by DSRC includes various other kinds of information in addition to emergency information, and the emergency information also includes various kinds of information. Irrespective of this fact, conventionally a warning sound is used according to the degree of urgency of information, and the user can only determine the existence/non-existence of emergency information and the degree of urgency by means of the warning sound. Hence, according to the conventional technology a user can not know the type of content of the relevant information by means of the warning sound.

An object of the present invention is to provide vehicle-mounted device including an audio reproduction function that allows a user to guess the content of received content information, and an audio reproduction method.

Means for Solving the Problems

An vehicle-mounted device of the present invention for achieving the above-described object basically includes communication means that performs wireless communication with a center apparatus via a roadside apparatus; reproduction means that performs audio reproduction; and control means that, in response to receiving content information from a center apparatus by means of the communication means, causes the reproduction means to perform audio reproduction of a notification sound that notifies that content information has been received. When causing audio reproduction of the notification sound, the control means operates so as to reproduce a notification sound that varies in accordance with an identifier attached to the received content information.

Further, the control means operates so as to reproduce a notification sound that varies in accordance with information indicating an event that is included in the content information.

According to another aspect of the invention of the present application, vehicle-mounted device includes communication means that performs wireless communication with a center apparatus via a roadside apparatus; reproduction means that performs audio reproduction; and control means that, in response to receiving content information from a center apparatus by means of the communication means, causes the reproduction means to perform audio reproduction of a notification sound that notifies that content information has been received, wherein when causing audio reproduction of the notification sound, the control means operates so as to reproduce a notification sound that varies in accordance with information indicating an event that is included in the received content information.

According to a further aspect of the invention of the present application, vehicle-mounted device includes communication means that performs wireless communication with a center apparatus via a roadside apparatus; reproduction means that performs audio reproduction; and control means that, in response to receiving content information from a center apparatus by means of the communication means, causes the reproduction means to perform audio reproduction of a notification sound that notifies that content information has been received, wherein when causing audio reproduction of the notification sound, the control means operates so as to analyze text information included in the received content information and reproduce a notification sound that varies in accordance with characters included in the text information.

The vehicle-mounted device may be configured such that reproduction precedence information is included in the content information, and in response to receiving a plurality of pieces of content information by means of the communication means, based on precedence information included in the content information, the control means operates so as to cause a notification sound for content information with a high precedence to be reproduced first.

Preferably, in response to receiving a plurality of pieces of content information by means of the communication means, the control means operates so as to cause reproduction of a notification sound that notifies to the effect that a plurality of pieces of content information have been received.

Preferably, the control means operates so as to reproduce a notification sound that varies in accordance with a time zone.

Preferably, the control means operates so as to reproduce a notification sound that varies in accordance with a traveling speed of a vehicle in which the vehicle-mounted device is installed.

Preferably, the control means operates so as to analyze the information indicating an event, calculate a distance from a present location to a location at which the event has occurred, and reproduce a notification sound that varies in accordance with the distance.

An audio reproduction method of the present invention is a method in which, in response to receiving content information from a center apparatus, processing is performed that causes audio reproduction of a notification sound that notifies that content information has been received, wherein at that time a notification sound is reproduced that varies in accordance with an identifier attached to the received content information.

Effects of the Invention

According to vehicle-mounted device and audio reproduction method relating to the present invention, by means of different notification sounds, a user can ascertain that the content of content information is different, and can guess the content thereof.

Further, by means of different notification sounds, a user can ascertain that not only an identifier but also an event is different, and can guess the content thereof.

According to a different aspect of the present invention, by means of different notification sounds, a user can ascertain that an event is different and can guess the content thereof.

According to another different aspect of the present invention, even in the case of content information with a specific identifier attached thereto, a user can ascertain that the content of the relevant content information is different, and can guess the content thereof.

In addition, the vehicle-mounted device according to the present invention has the following technical advantages. (i) Notification sounds can be reproduced by giving priority to information that has a higher precedence, and thus it is possible to adjust the order of notification in accordance with the degree of urgency or the importance.
(ii) The user can guess when a plurality of pieces of content information are received.
(iii) Notification sounds can be varied in accordance with a time zone in which reproduction of content information is performed or a time zone that can be predetermined or the like, and it is thus possible for a user to guess a time zone.
(iv) Since a traveling speed is compared with a time until arriving at a certain event, it is possible for a user to guess a time until arriving at the event.
(v) It is possible for a user to guess a distance until arriving at an event.

DESCRIPTION OF SYMBOLS

100 distribution system
10 vehicle-mounted device
1 car navigation unit
1*d* operation unit
1*e* display unit
1*f* memory unit
T table
3 DSRC unit
3*a* DSRC control unit
3*b* communication unit
3*c* memory unit
4 control unit
5 reproduction unit
20 roadside apparatus
30 center apparatus

BEST MODES FOR CARRYING OUT THE INVENTION

First, the configuration is described.

Figure 1:
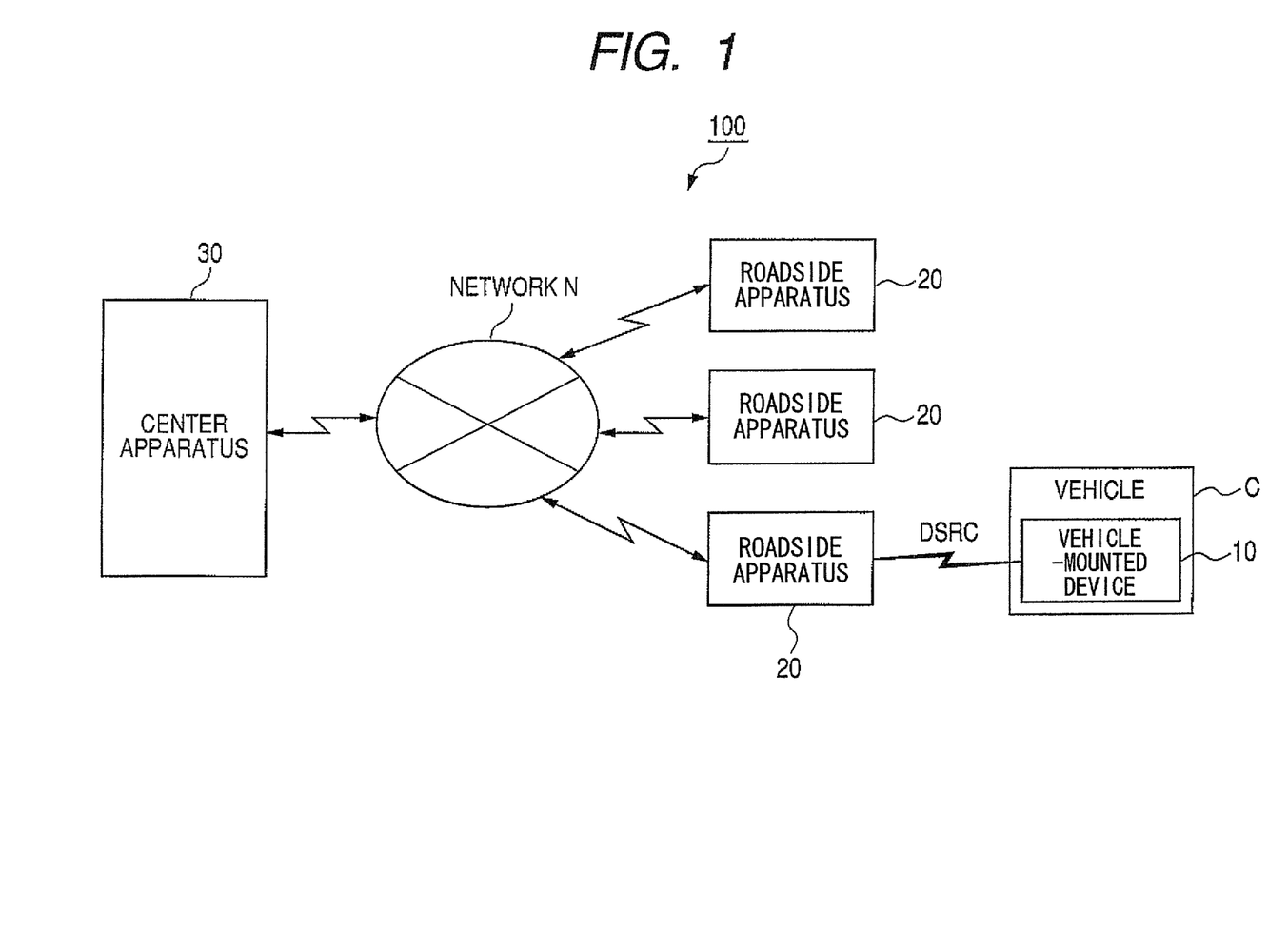
FIG. 1 is a view showing a configuration of a distribution system.

FIG. 1 shows the system configuration of a distribution system 100 that includes vehicle-mounted device according to the first embodiment.

As shown in FIG. 1, the distribution system 100 includes vehicle-mounted device 10 mounted in a vehicle C, roadside apparatuses 20, and a center apparatus 30. The center apparatus 30 distributes content information to the vehicle-mounted device 10 via the roadside apparatus 20. The term "content information" refers to text information, image information, read-out information and the like that is provided to a user. Examples of the content thereof include, in addition to traffic information, store advertisements, guides to car parks and facilities, and various other kinds of information. The details of the content information are described later.

Each component of the distribution system 100 is described in detail below.

The center apparatus 30 stores content information, and distributes the content information to the vehicle-mounted device 10. A computer terminal including a control unit that performs distribution control, a communication unit that performs communication with the roadside apparatuses 20, and a memory unit that stores content information and the like can be applied as the center apparatus 30.

Although only one center apparatus 30 is shown in FIG. 1, a plurality of distribution enterprisers distribute content information, and each distribution enterpriser is equipped with a center apparatus 30.

The content information distributed by the center apparatus 30 is described next.

Figure 2:
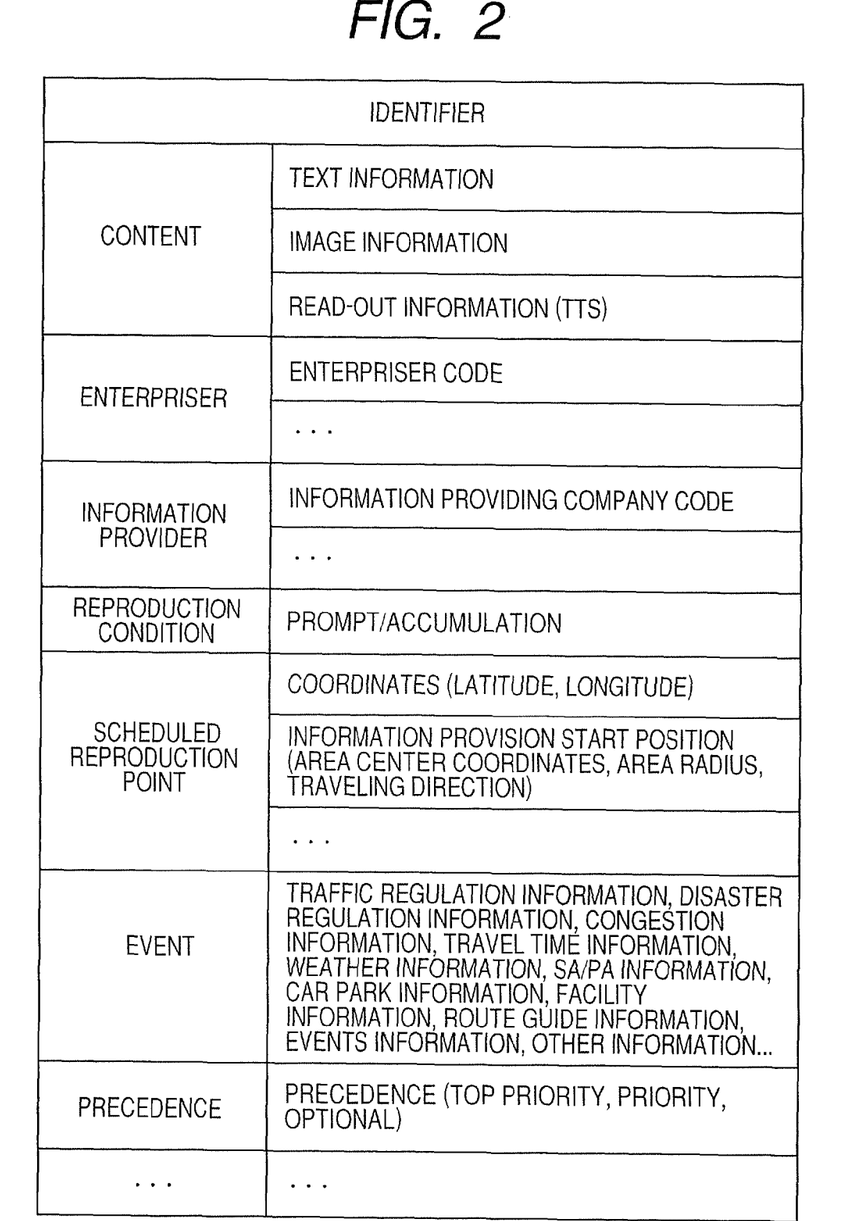
FIG. 2 is a view showing a format example of content information.

FIG. 2 is a view that shows an example of the format of content information.

As shown in FIG. 2, in addition to an identifier attached to the content information and the content (text information, image information, read-out information and the like), the content information includes information such as a content information distribution enterpriser, an information provider, a reproduction condition, a scheduled reproduction point at which to provide (reproduce) the information, an event, and a precedence.

An identifier is attached to the content information in accordance with the content thereof. The identifier is information that shows the classification of the content information when the information is broadly classified according to the content thereof. The classifications may include, for example, safe driving support information, caution and warning information, multipurpose information, long read-out information and the like. An identifier is attached to the content information in accordance with the classification thereof. For example, an identifier "F1" is attached when the content is classified as safe driving support information, and an identifier "F2" is attached when the content is classified as multipurpose information.

The content information is divided into prompt type and accumulation type according to the reproduction timing. Reproduction condition information that shows which type the relevant content information belongs to is included in the content information. The prompt type content information is reproduced immediately after reception. The accumulation type content information is reproduced are being temporarily accumulated (stored in memory), and is reproduced when the vehicle arrives at a scheduled reproduction point. For example, since content information that is classified as safe driving support information has a high degree of urgency, this information is designated as prompt type. In contrast, since content information that is classified as multipurpose information includes information that has a high degree of urgency and information that does not have a high degree of urgency depending on the content, that classification includes both information designated as prompt type and information designated as accumulation type.

Figure 3:
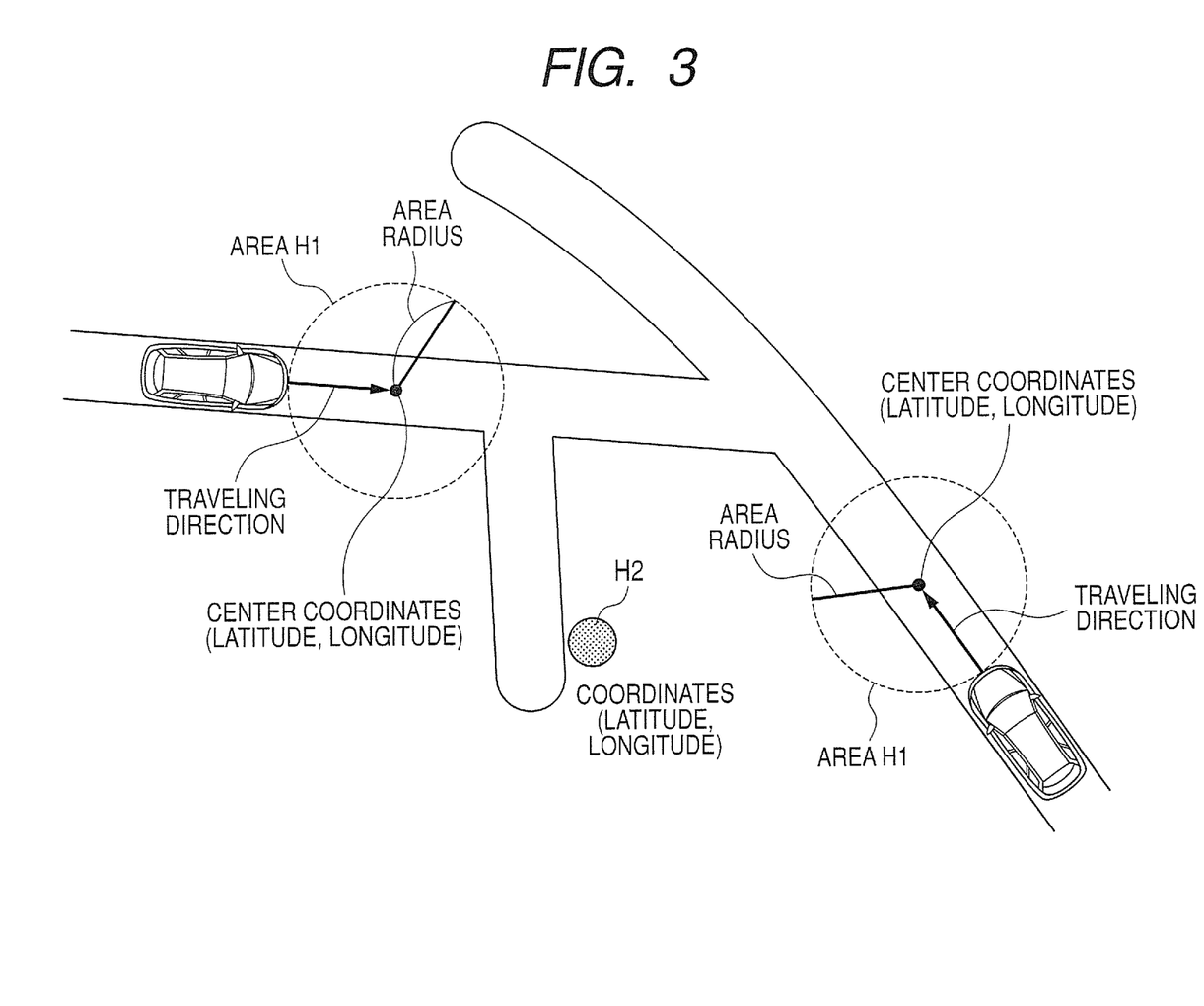
FIG. 3 is a view describing scheduled reproduction points of accumulation type content information.

The term "scheduled reproduction point" refers to an area H1 on a road or a site H2 at which a store or the like is located, as shown in FIG. 3, that are designated as positions at which to start reproduction. The content information includes information regarding a scheduled reproduction point (information such as coordinates that indicate a location). This designation information is analyzed by the vehicle-mounted device 10 to determine if the vehicle has arrived at a scheduled reproduction point. When the vehicle-mounted device 10 determines that the vehicle has arrived at a scheduled reproduction point, the vehicle-mounted device 10 performs reproduction of the accumulation type content information.

In the case of the designated area H1 on the road, information regarding the center coordinates (latitude, longitude) of the circular area H1, the traveling direction of the vehicle C towards the center coordinates, and an information provision start position at the radius of the area is included in the content information. This designation information is analyzed by the vehicle-mounted device 10, and when the vehicle C arrives at a distance equal to the amount of the radius from the center coordinates and the traveling direction of the vehicle C and the designated traveling direction match, the vehicle-mounted device 10 starts reproduction of the content information.

Content information for which audio reproduction is performed includes long read-out information that comprises text information for display of a read-out sentence and TTS (Text to Speech). TTS is information for speech synthesis. When reproducing read-out information, it is necessary to execute processing that generates speech information from text information for display based on TTS.

The content information also includes information indicating an event related to vehicular traffic. The term "event" refers to an incident or situation. Examples of information indicating an event include traffic regulation information, disaster regulation information, congestion information, weather information, car park information, SA (service area) and PA (parking area) information, facility information, route guidance information, events information, construction work information, road surface information, and earthquake information. The content information includes information indicating the event relating to the content thereof among these different kinds of information indicating an event.

Some content information is unrelated to an event. In that case the content information does not include information indicating an event. Content information that does not include information indicating an event can be distinguished by an identifier. More specifically, when a specific identifier is attached, it indicates that information indicating an event is not included in the content information.

The content information is classified into top priority information, priority information, and optional information according to the reproduction precedence. The precedence in the order from highest to lowest precedence is top priority information, priority information, and optional information. Top priority information is content information that is reproduced immediately after reception. Prompt type content information corresponds to top priority information, and examples thereof include emergency message information such as notification of an earthquake or the like. Priority information is information that is definitely reproduced after it is received, but the reproduction timing thereof is not particularly specified. Examples thereof include caution and warning information such as information relating to accidents. Optional information is information that the user can select whether to reproduce or not, and the reproduction timing thereof is also not particularly specified. For example, the optional information corresponds to general advertising information or highway radio.

The content information includes precedence information that shows whether the content information corresponds to top priority information, priority information, or optional information. The vehicle-mounted device 10 analyzes this information to determine the precedence of the content information.

A plurality of the roadside apparatuses 20 are installed on roads and in car parks and the like. Each roadside apparatus 20 is connected with the center apparatus 30 through a network N. Wireless communication can be performed between the roadside apparatuses 20 and the vehicle-mounted device 10 of the vehicle C traveling on a road.

Figure 4:
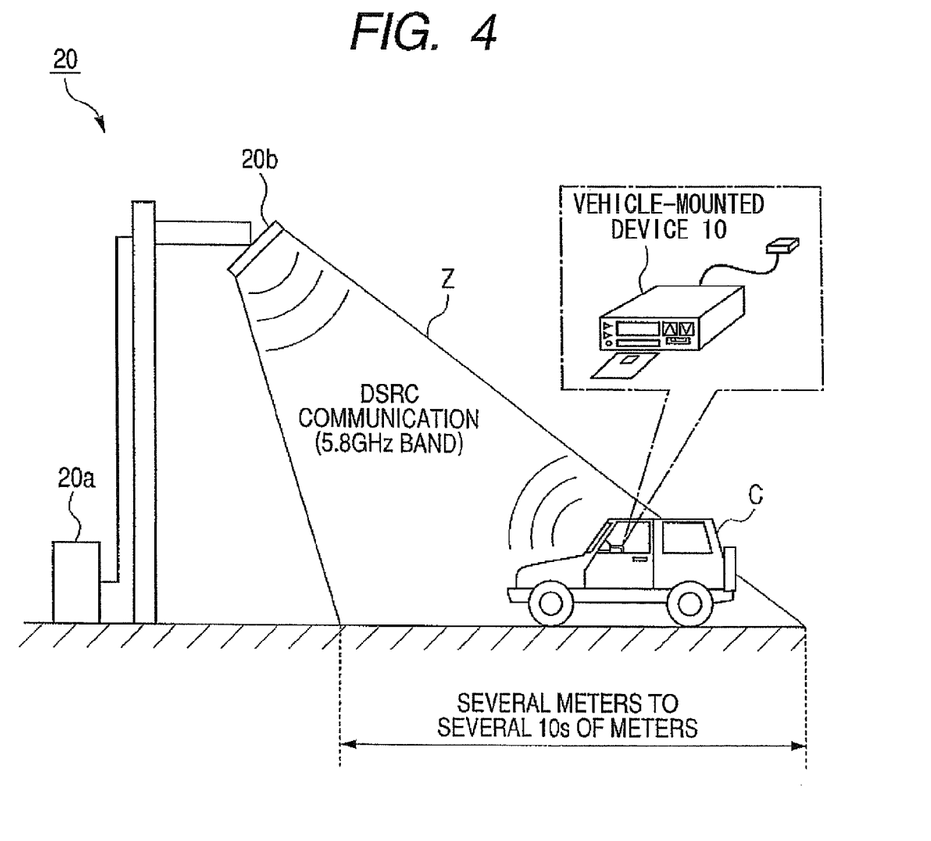
FIG. 4 is a view that describes a road side area of the roadside apparatus shown in FIG. 1.

As shown in FIG. 4, the roadside apparatus 20 includes a main body apparatus 20a and an antenna 20b. The roadside apparatus 20 emits DSRC-type radio waves that have a limited range from the antenna 20b installed at the side of a road or over a road, to thereby form a road side area Z in the vicinity of the roadside apparatus 20. It is thus possible to perform two-way dedicated short range communication with only the vehicle-mounted device 10 of the vehicle C that is inside the road side area Z. Hereunder, dedicated short range communication between the roadside apparatus 20 and the vehicle-mounted device 10 may be referred to as "communication between road and vehicle".

DSRC is a communication system that uses radio waves of a 5.8 GHz frequency band. The communication range thereof is, for example, from several meters to several tens of meters. The transmission output of DSRC from the roadside apparatuses 20 is set to the same level for each device. Hence, respective road side areas Z that are formed by a plurality of roadside apparatuses 20 are approximately constant.

The main body apparatus 20a performs processing for mediating the exchange of information between the vehicle-mounted device 10 and the center apparatus 30. More specifically, the main body apparatus 20a transfers information received from the vehicle-mounted device 10 through the antenna 20b to the center apparatus 30, and transfers content information transmitted from the center apparatus 30 to the vehicle-mounted device 10. A computer terminal that includes a control unit that performs information processing and communication control and a memory unit and the like can be applied as the main body apparatus 20a.

The vehicle-mounted device 10 is installed in the vehicle C, and in addition to a navigation function that performs processing for guiding the vehicle C along a guide route, the vehicle-mounted device 10 has a function that performs processing for utilization of an ETC (Electronic Toll Collection System) by DSRC and the like.

Figure 5:
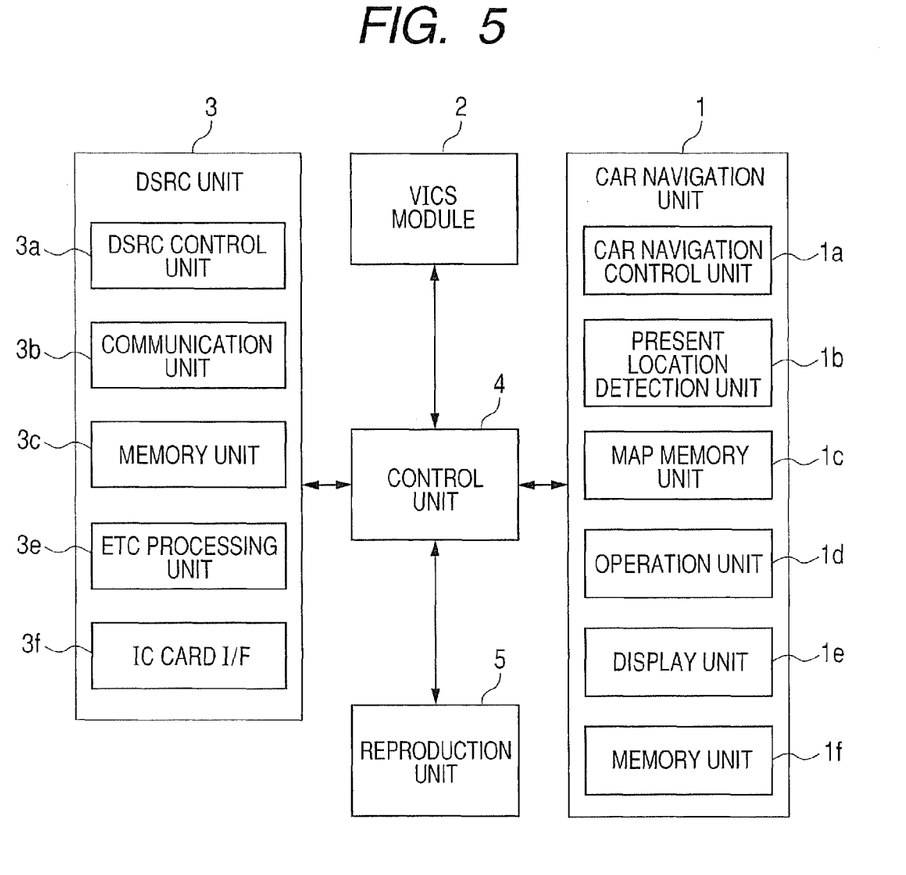
FIG. 5 is a view that shows a configuration of the vehicle-mounted device shown in FIG. 1.

As shown in FIG. 5, the vehicle-mounted device 10 includes a car navigation unit 1, a VICS module 2, a DSRC unit 3, a control unit 4 and a reproduction unit 5.

The control unit 4 includes a CPU (Central Processing Unit), a RAM (Random Access Memory) and the like. In addition to performing various computations by cooperation with a control program stored in a memory unit 1f, the control unit 4 also performs centralized control of each component.

For example, when performing communication between road and vehicle with respect to the roadside apparatus 20, the control unit 4 controls communication operations of the DSRC unit 3. When controlling the DSRC unit 3, the control unit 4 performs control by cooperation with a DSRC control unit 3a of the DSRC unit 3. The control unit 4 also performs control to store and display content information received from the center apparatus 30 through the DSRC unit 3.

The car navigation unit 1 includes a car navigation control unit 1a, a present location detection unit 1b, a map memory unit 1c, an operation unit 1d, a display unit 1e, a memory unit 1f and the like. The car navigation unit 1 performs processing for guiding the vehicle C along a guide route.

The car navigation control unit 1a calculates a guide route as far as a destination that is set through the operation unit 1d from the present location of the vehicle C based on information regarding the present location that is acquired from the present location detection unit 1b and map information and the like stored in the map memory unit 1c. The car navigation control unit 1a then generates a map screen for guiding the vehicle C along the guide route that has been calculated using the map information stored in the map memory unit 1c, and displays the map screen using the display unit 1e.

The present location detection unit 1b includes a GPS antenna, and various sensors such as an angle sensor, a direction sensor, and a distance sensor, and detects the present location of the vehicle C based on detection results obtained from these sensors. The GPS antenna detects a GPS signal transmitted from a GPS satellite. The angle sensor detects the acceleration (number of revolutions in the horizontal direction per unit time) of the vehicle that shows the amount of change in the movement direction. The direction sensor carries out detection of terrestrial magnetism to detect the absolute direction of the vehicle. Based on the direction results acquired from these sensors, the present location detection unit 1b generates present location information (information such as longitude and latitude) showing the present location of the vehicle and traveling speed information, and outputs the information to the car navigation control unit 1a.

The map memory unit 1c comprises a recording medium such as a memory or a DVD. The map memory unit 1c stores map information necessary for guidance display as well as guidance information (road information and congestion information and the like) that is received via the VICS module 2.

The operation unit 1d comprises a touch panel in which operation keys and the display unit 1e are integrated and the like. The operation unit 1d generates operation signals corresponding to operations of the operation keys and the display unit 1e and the like, and outputs the operation signals to the control unit 31.

The display unit 1e includes a monitor, and displays various information on the monitor in accordance with control of the control unit 4. For example, the display unit 1e is a setting screen or a map screen, or a screen that displays content information received from the center apparatus 30.

The memory unit 1f comprises a memory. The memory unit 1f stores control programs executed by the control unit 4 or the car navigation control unit 1a and data and parameters necessary for execution of the programs.

For example, the memory unit 1f stores various kinds of notification sounds. The notification sounds are described later. In addition, the memory unit 1f stores content information received from the center apparatus 30.

The memory unit 1f also stores a table that shows the correlation between events or character strings and notification sounds. For example, as shown in a table T in FIG. 6, corresponding notification sounds A1 to AN and B1 to BN are defined for each event or for each character string. The numerals 1 to N that are assigned for each event and each character string denote the number of the event or the character string, and AN to BN are numbers assigned to the notification sounds.

Figure 6:
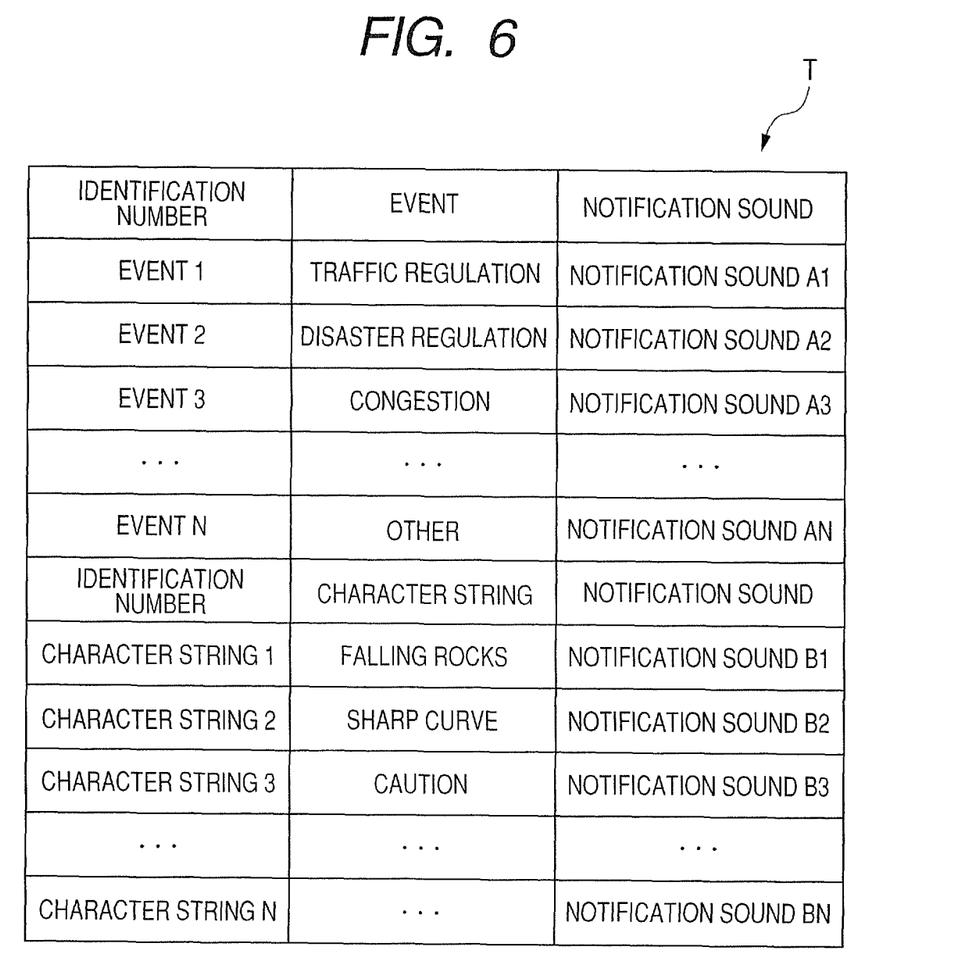
FIG. 6 is an example of a table that defines the correspondence between events or character strings and notification sounds.

For example, an event denoted by event 1 is "traffic regulation", and the notification sound for that event is A1. Further, a character string denoted by character string 1 is "falling rocks", and notification sound B1 corresponds thereto. Thus, respectively different notification sounds are defined in the table T for each event and each character string.

The VICS module 2 is equipped with antennas for optical communication, FM communication, and 2.4 GHZ radio wave communication, respectively. The VICS module 2 performs optical communication, FM communication and radio wave communication with a VICS center. The VICS module 2 receives congestion information and road traffic information and the like from the VICS center, and outputs the information to the control unit 31.

The DSRC unit 3 performs processing for ETC utilization by DSRC, and communication processing for receiving content information from the center apparatus 30 and the like.

As shown in FIG. 5, the DSRC unit 3 includes a DSRC control unit 3a, a communication unit 3b, a memory unit 3c, an ETC processing unit 3e, and an IC card I/F 3f.

The DSRC control unit 3a includes a CPU and a RAM and the like, and controls operations of each part of the DSRC unit 3 by cooperation with a control program stored in the memory unit 3c.

For example, when making a payment by ETC, the DSRC control unit 3a controls a communication operation of the communication unit 3b to transmit and receive payment information to and from an ETC base station (a wireless base station provided in the vicinity of an ETC gate or the like for making ETC payments). The DSRC control unit 3a also causes the ETC processing unit 3e to perform processing to write payment information.

Further, when content information is received via the roadside apparatus 20 by the communication unit 3b, the DSRC control unit 3a outputs the received content information to the control unit 4.

The communication unit 3b includes an antenna that is fixedly provided in the vicinity of the front glass on the dashboard of the vehicle C. The communication unit 3b transmits and receives DSRC-type radio waves to and from the roadside apparatus 20 or an ETC base station or the like via the antenna.

The memory unit 3c stores a control program that is executed by the DSRC control unit 3a and the like.

The ETC processing unit 3e performs reading and writing of payment information with respect to a debit card or a credit card with an IC (integrated circuit) that is detachably inserted into the IC card I/F 3f.

The IC card I/F 3f includes a slot for the above described credit card or the like. The IC card I/F 3f mediates the exchange of information between an IC of a credit card or the like inserted into the slot and the ETC processing unit 3e.

The reproduction unit 5 includes a speaker or the like, and carries out audio reproduction.

When reproducing read-out information, since the read-out information is described with an intermediate language, the reproduction unit 5 performs read-out reproduction processing that converts the read-out information into speech information and reproduces the speech information. In the read-out reproduction processing, the reproduction unit 5 analyses the read-out information to generate parameters (speech segment, phoneme duration length, pitch, pattern of amplitude variations over time, and the like) that are necessary for speech synthesis. The reproduction unit 5 then synthesizes speech waveforms using the generated parameters. The reproduction unit 5 outputs synthetic speech signals using a speaker to thereby perform audio reproduction.

Next, operation of the vehicle-mounted device 10 is described.

Figure 7:
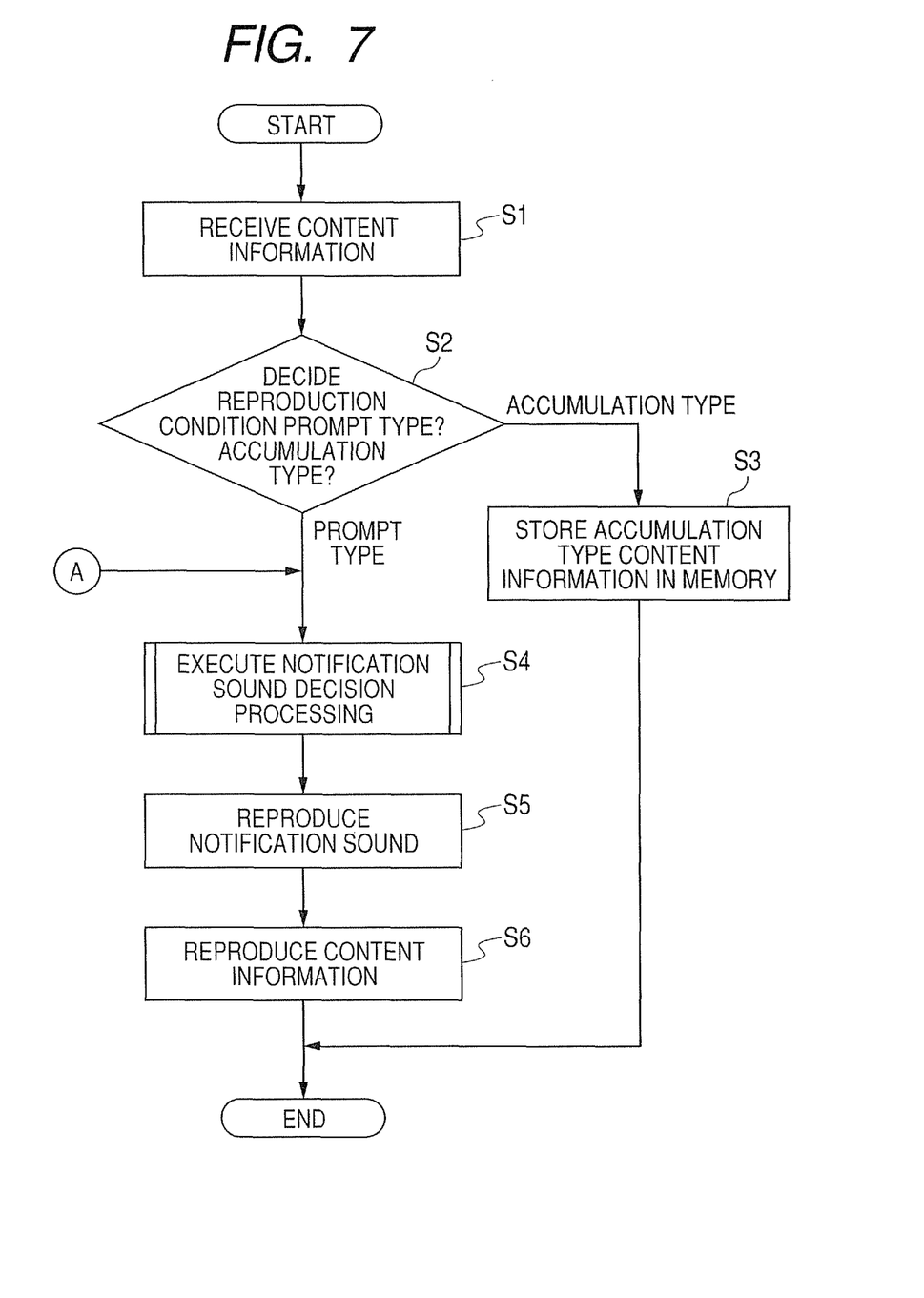
FIG. 7 is a flowchart that illustrates content notification processing that is executed by vehicle-mounted device.

FIG. 7 is a flowchart that describes content notification processing executed by the vehicle-mounted device 10. The content notification processing is processing that, upon receiving content information, reproduces a notification sound that notifies the user to the effect that content information has been received. The notification sound may be a single sound such as a buzzer sound, or may be a voice or music such as a melody.

As shown in FIG. 7, when content information transmitted from the center apparatus 30 is received by the DSRC unit 3 (step S1), the control unit 4 refers to information showing a reproduction condition that is included in the content information to decide if the content information is prompt type or accumulation type (step S2). In this connection, since the control unit 4 can also decide whether or not the content information is prompt type based on the identifier included in the content information, a configuration may also be adopted in which the control unit 4 refers to the identifier to decide if the content information is prompt type or accumulation type. For example, since safe driving support information is designated as prompt type, when the identifier indicates that the content information is safe driving support information, the control unit 4 can decide that the content information is prompt type.

When the content information is accumulation type (step S2: accumulation type), the control unit 4 stores the accumulation type content information in the memory 1f (step S3) and ends the present processing.

In contrast, if the content information is prompt type (step S2: prompt type), the control unit 4 moves to notification sound decision processing in step S4.

The notification sound decision processing is described below referring to FIG. 8.

Figure 8:
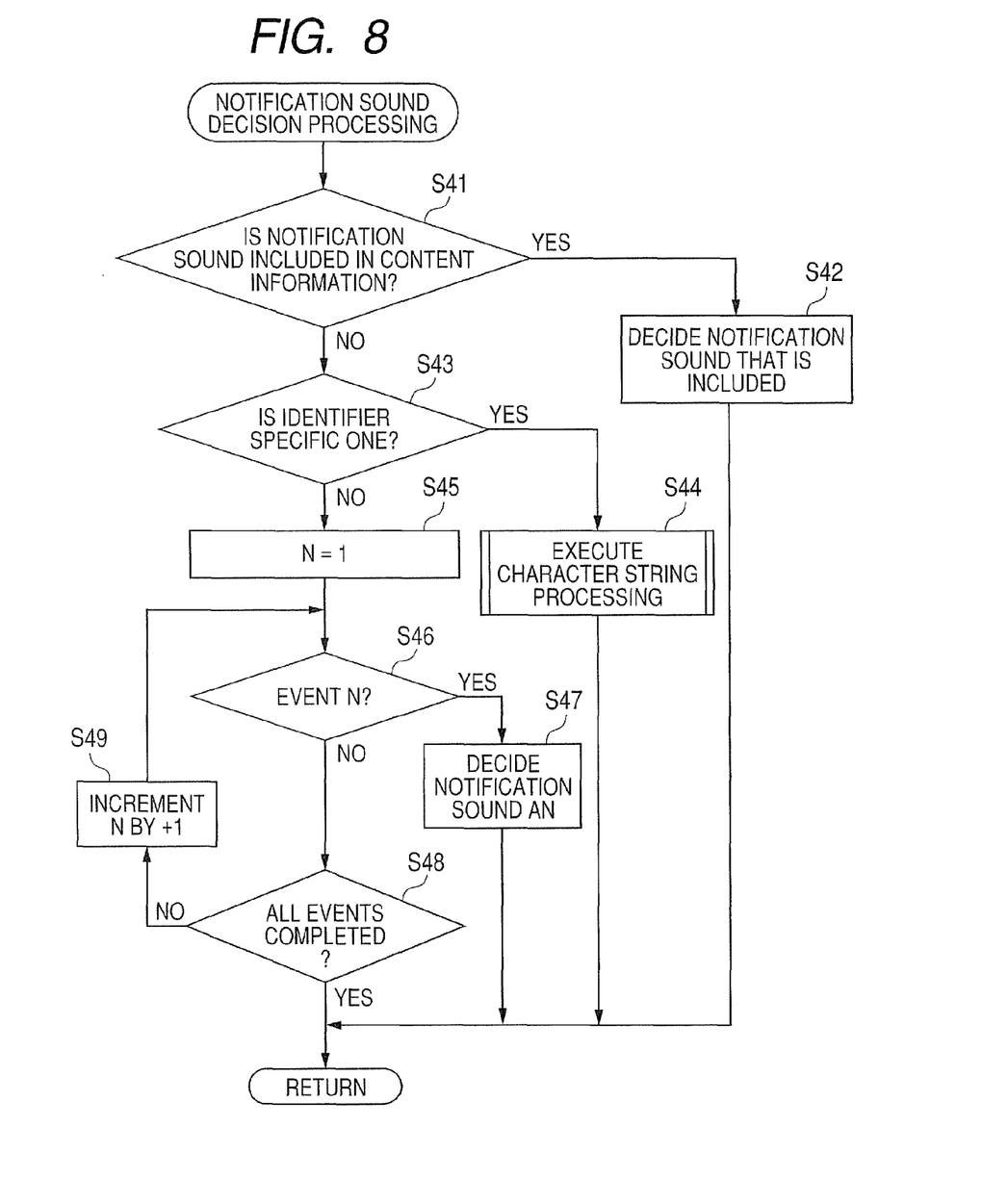
FIG. 8 is a flowchart that illustrates notification sound decision processing.

As shown in FIG. 8, first, the control unit 4 determines whether or not notification sound information is included in the content information (step S41). When notification sound information is included in the content information (step S41: Y), the control unit 4 uses the notification sound included therein as a notification sound that notifies reception of the content information (step S42).

In contrast, when notification sound information is not included in the content information (step S41: N), the control unit 4 refers to the identifier of the content information and determines whether or not the identifier is a specific identifier (step S43). The term "specific identifier" refers to an identifier that shows the classification of content information that does not include information indicating an event. For example, when content information is classified as safe driving support information, the content information does not include information indicating an event. Hence, "F1" that denotes the classification of safe driving support information may be previously set as the specific identifier, and the control unit 4 may then determine whether or not the identifier of the received content information corresponds to "F1".

When the identifier is a specific one (step S43: Y), the control unit 4 moves to character string processing in step S44. The character string processing is described in detail later. First, the processing of step S45 is described for a case in which the identifier is not a specific one (step S43: N).

When the identifier is not a specific one (step S43: N), it indicates that the content information should include information indicating an event. Hence, the control unit 4 decides a notification sound based on the information indicating an event.

First, the control unit 4 sets an event number N to an initial value 1 (step S45). Next, the control unit 4 refers to the information indicating an event that is included in the content information. When the event in the content information is event number N (step S46: Y), the control unit 4 selects a notification sound AN that corresponds to the event number N based on the table T stored in the memory unit 1f, and takes that notification sound AN as the sound to be used to notify reception of the content information (step S47). In table T, since the notification sound is different for each event, when the number N is different, that is, when the event is different, the notification sound thereof is also different. Thereafter, the control unit 4 moves to the processing in step S5 in FIG. 7.

In contrast, when the event in the content information is not event number N (step S46: N), if determination has not been completed for events of all the numbers in the table T (step S48: N), the control unit 4 increments N by +1 (step S49). Thereafter, the control unit 4 moves to the processing in step S46 and repeats the processing to determine whether or not the event in the content information is the event of incremented number N. After performing this determination for all events (step S48: Y), the control unit 4 moves to step S5 in FIG. 7.

Figure 9:
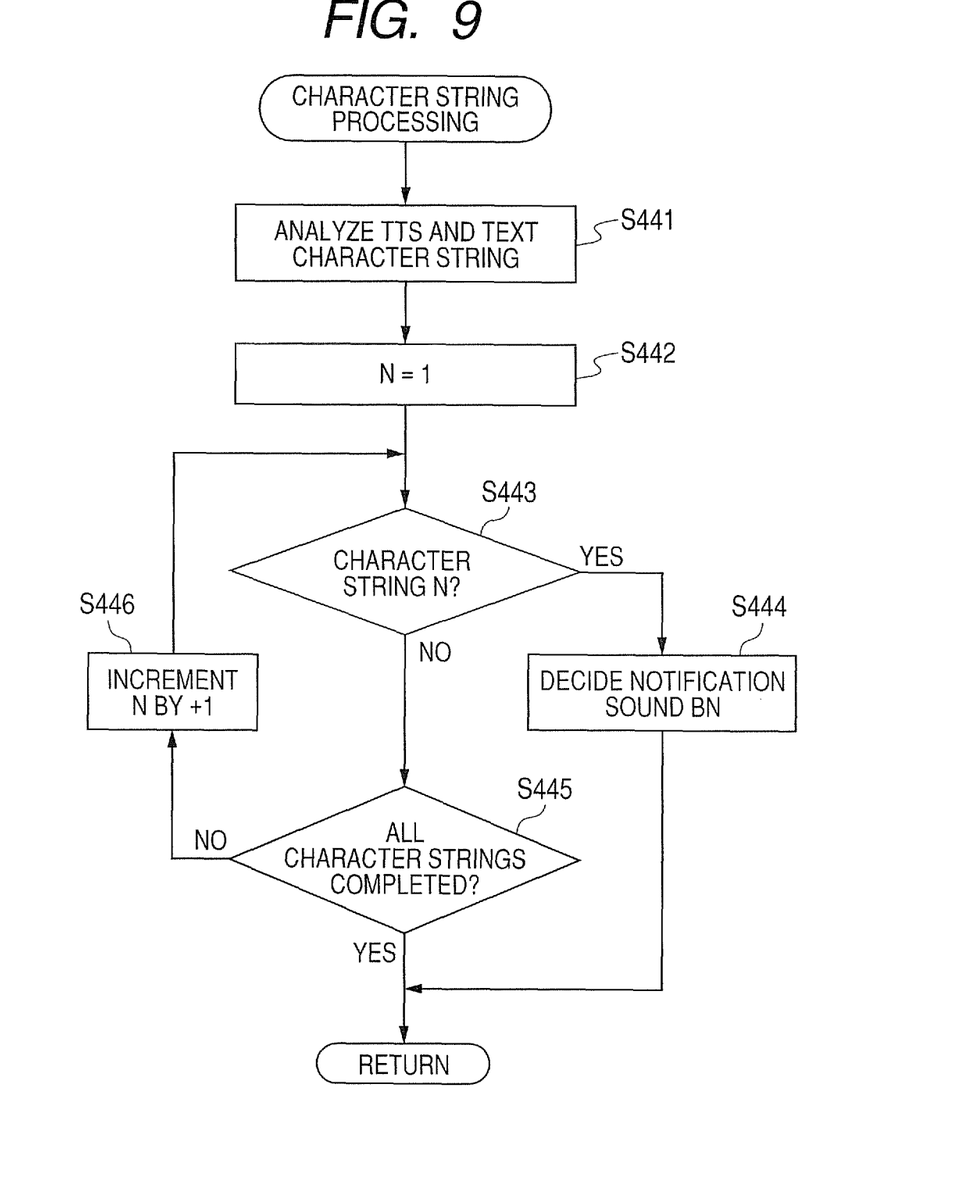
FIG. 9 is a flowchart that illustrates character string processing.

Next, the character string processing in step S44 is described referring to FIG. 9.

When the identifier of the content information is a specific one, since information indicating an event is not included, the notification sound will differ according to a character string of text of a read-out sentence included in the content information.

As shown in FIG. 9, first the control unit 4 analyzes a character string within the text using read-out information (TTS and text information of a read-out sentence) included in the content information (step S441). Specifically, the control unit 4 recognizes and extracts a character string within the text based on TTS.

Meanwhile, the control unit 4 sets the number N of a character string previously stored in the memory unit 1*f* for reference to the initial value 1 (step S442), and compares the character string of number N and the character string that has been extracted from the text bye the aforementioned character string analysis. If the character strings match (step S443: Y), the control unit 4 determines a notification sound BN that corresponds to the matched character string of number N based on the table T, and takes the notification sound BN as the notification sound to use to notify reception of the content information (step S444).

When the extracted character string does not match the character string of number N (step S443: N), if comparison is not completed for all character strings inside the table T (step S445: N) the control unit 4 increments the number N by +1 (step S446) and returns to the processing of step S443. The control unit 4 then repeats the processing to compare the character string extracted from the text using the character string of the incremented number N. Upon completing comparison for character strings of all numbers N (step S445: Y), the control unit 4 moves to step S5 in FIG. 7.

The processing from step S5 in FIG. 7 is described below.

The control unit 4 causes the reproduction unit 5 to perform audio reproduction using the notification sound that has been decided by the notification sound decision processing (step S5). When the audio reproduction ends, the control unit 4 causes the reproduction unit 5 to reproduce prompt type content information (step S6). In this case, the reproduction of content information includes audio reproduction by the reproduction unit 5 and display reproduction by the display unit 1*e*. In this connection, a configuration may also be adopted that varies the size of text characters to be reproduced and displayed according to the type of event. For example, the size of displayed characters is increased in the case of an accident, while the characters are displayed in the normal size for other kinds of events. The user can thus ascertain that the content of content information varies in accordance with the size of the characters.

Figure 10:
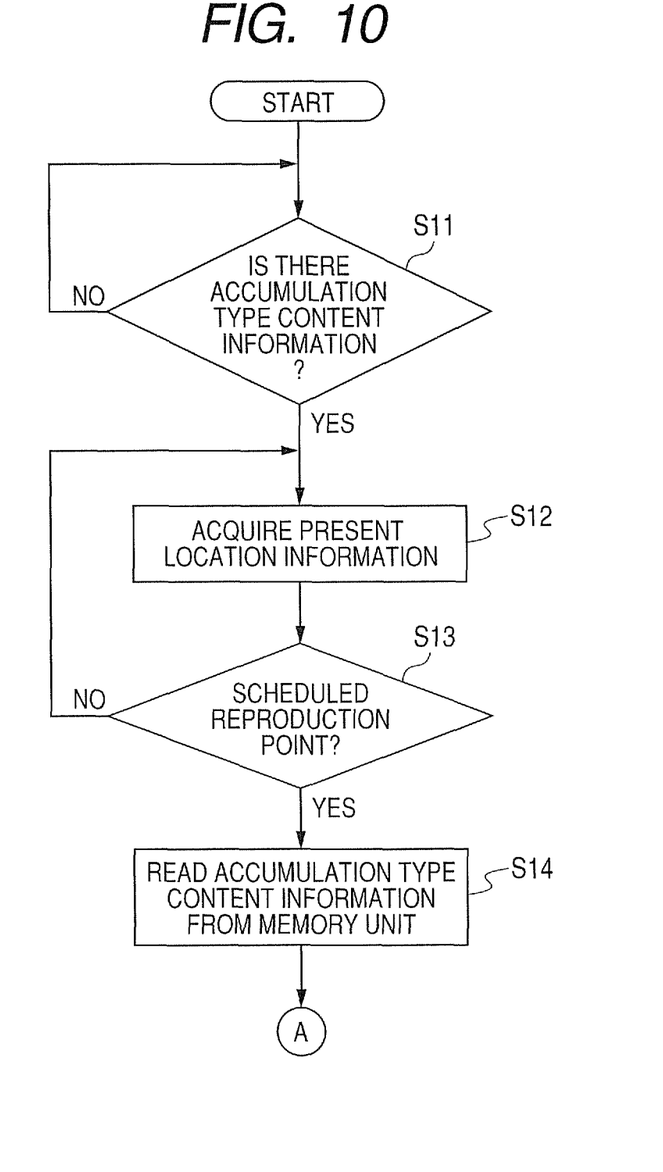
FIG. 10 is a flowchart that illustrates a flow when processing accumulation type content information.

Next, processing that is performed separately from the above content notification processing is described with respect to accumulation type content information referring to FIG. 10.

As shown in FIG. 10, when the control unit 4 determines that accumulation type content information is stored in the memory unit 1*f* (step S11: Y), the control unit 4 acquires information regarding the present location of the vehicle C by means of the present location detection unit 1*b* (step S12).

Subsequently, the control unit 4 determines whether or not the vehicle C has arrived at a scheduled reproduction point based on scheduled reproduction point information included in the accumulation type content information and the acquired information regarding the present location (step S13). When the control unit 4 determines that the vehicle C has arrived at a scheduled reproduction point (step S13: Y), the control unit 4 reads out the accumulation type content information from the memory unit 1*f* (step S14). Thereafter, the control unit 4 starts the above described content notification processing from the notification sound decision processing in step S4 shown in FIG. 7. More specifically, with regard to accumulation type content information also, the control unit 4 decides a notification sound at the time of reproduction, and reproduces the decided notification sound prior to reproducing the content information.

As described above, according to the present embodiment, upon receiving content information the control unit 4 performs reproduction of a notification sound corresponding to an event or identifier based on information indicating an event or an identifier that is included in the relevant content information, to thereby notify the user that content information has been received. Different notification sounds are defined for each event or identifier. Hence, a notification sound that varies according to the event or identifier is reproduced. By means of the different notification sounds, the user can ascertain that the content of content information is different, and can guess the content thereof.

When reproducing a notification sound corresponding to an identifier, the control unit 4 analyzes text information included in the content information and reproduces a notification sound that varies according to a character string included in the text. Hence, similarly to the case described above, the user can ascertain that the content is different by means of the notification sound, and can guess the content.

The above described embodiment is one preferred example of the present invention.

For example, a configuration may also be adopted in which notification sounds are prepared beforehand in accordance with identifiers, and notification sounds are reproduced according to the specific identifiers. In the foregoing description, when the identifier is a specific one, text analysis is performed in the character string processing and a notification sound is decided according to a character string. However, for example, when the identifier is an identifier of safe driving support information that is a specific one, the control unit 4 may decide on the notification sound that corresponds to the safe driving support information as the notification sound to be reproduced, without performing text analysis or the like.

Figure 11:
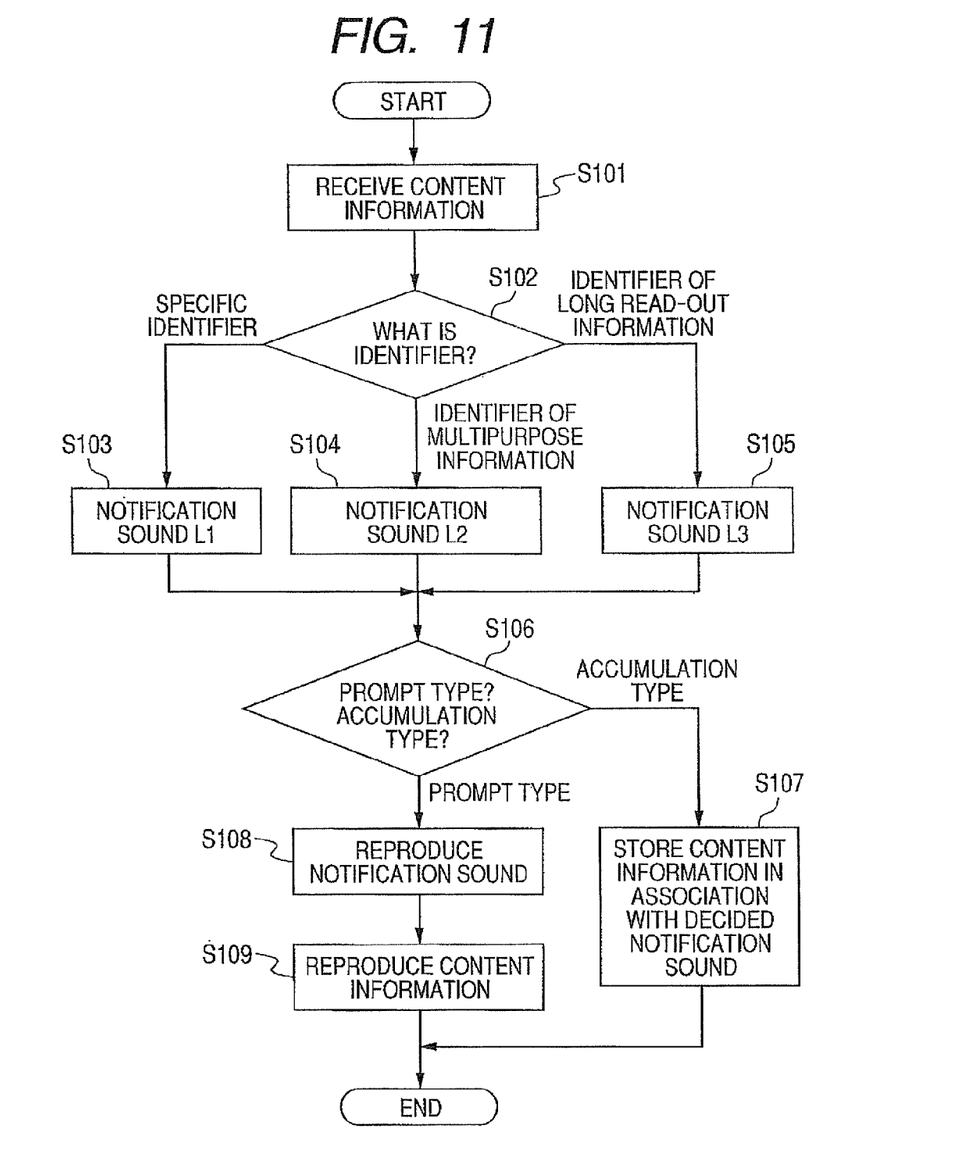
FIG. 11 is a flowchart that illustrates a processing flow relating to another example.

FIG. 11 illustrates the flow of processing in a case in which notification sounds vary according to identifiers.

As shown in FIG. 11, first, upon receiving content information (step S101), the control unit 4 determines what the identifier attached to the content information is (step S102). If the identifier is a specific one (step S102: specific identifier), the control unit 4 decides to use the notification sound L1 (step S103). If the identifier is not a specific identifier and is an identifier of multipurpose information (step S102: identifier of multipurpose information), the control unit 4 decides to use the notification sound L2 (step S104). Further, if the identifier is an identifier of long read-out information (step S102: identifier of long read-out information), the control unit 4 decides to use the notification sound L3 (step S105). In this connection, the notification sounds L1 to L3 are respectively different notification sounds.

After deciding the notification sound, the control unit 4 determines whether the content information is prompt type or accumulation type (step S106). If the content information is accumulation type (step S106: accumulation type), the content information is stored in the memory unit 1*f* in association with the decided notification sound (one of L1 to L3) (step S107). For accumulation type content information, the corresponding notification sound is reproduced upon arrival at a scheduled reproduction point, and thereafter the content information is reproduced. In this connection, a configuration may also be adopted such that, for accumulation type content information, processing is further performed that decides a different notification sound in accordance with the event.

In contrast, if the content information is prompt type (step S106: prompt type), after performing reproduction of the decided notification sound L1 to L3 by means of the reproduction unit 5 (step S108), reproduction of the content information is performed (step S109).

The user can thereby ascertain that the identifier is different by means of the notification sound.

Further, when a plurality of pieces of content information are received and information indicating an event is included in each piece of content information or the same identifier is attached to each piece of content information, the notification sounds may be reproduced in the received order, or a notification sound for notifying that a plurality of pieces of content information have been received may be prepared beforehand, and that notification sound may be reproduced. Further, a configuration may be adopted that sets a precedence for pieces of information indicating an event, and reproduces the pieces of information indicating an event in order from the piece of information with the highest precedence. For example, a traffic regulation event may be previously set to have a higher precedence than a car park event. When content information relating to a traffic regulation event and content information relating to a car park event are received in the same period, by giving precedence to reproduction of the notification sound corresponding to the traffic regulation event the user can be notified of the content information with greater importance first.

Notification sounds may also differ according to time zones.

For example, if a notification sound D is used for a traffic regulation information event, a notification sound D1 is used when the time zone in which content information is reproduced is during the morning, a notification sound D2 is used when the time zone is the afternoon, and a notification sound D3 is used when the time zone is the evening. Thus, even when content information is for the same event, notification sounds may differ in accordance with the time zone in which reproduction of the content information is performed. By such differences in the notification sounds, not only can a user ascertain the content of content information, but the user can also ascertain that a time zone is different.

More specifically, notification sounds that differ according to each time zone are defined in advance inside the table T, and when deciding a notification sound, the control unit 4 may select a notification sound that matches the time zone based on the table T.

A configuration may also be adopted in which notification sounds differ according to time zones that are previously set in the vehicle-mounted device 10, and not the time zones in which reproduction is performed. In this case, taking the above described example, the notification sound D1 is reproduced during the period from 7 am to 11 am, the notification sound D2 is reproduced during the period from 11 am to 3 pm, and the notification sound D3 is reproduced during the period from 3 pm to 8 pm. Similarly, the user can ascertain that a time zone is different.

A configuration may also be adopted that varies the notification sounds according to the distance from the present location to the event.

For example, in the case of an accident event, since in some cases the content information includes information (longitude, latitude and the like) regarding the location at which the accident occurred, the control unit 4 acquires information regarding the present location that is detected by the present location detection unit 1b, and calculates a distance from the detected present location to the location at which the accident occurred, i.e. the distance to the event. If the event is on a guided route, the control unit 4 calculates the distance thereto along the guided route. For example, if the calculated distance is within 3 km, the control unit 4 reproduces a notification sound E1 that notifies the user that there is a short distance to the event, if the distance is between 3 and 10 km, the control unit 4 reproduces a notification sound E2 that notifies the user that there is still some distance to the event, and if the distance is more than 10 km, the control unit 4 reproduces a notification sound E3 that notifies the user that the event is far from the present location. Thus, the user can ascertain whether an event is near or far from the present location. In particular, this is effective when the positional relationship between an event and the vehicle C is important, such as in the case of an accident.

The distance conditions for varying notification sounds may be determined in advance and stored in the memory unit 1f, and the control unit 4 may refer to the conditions when deciding a notification sound and select a notification sound that matches the relevant condition.

Further, a configuration may be adopted that predicts a time until the vehicle C approaches an event in accordance with the traveling speed of the vehicle C, and varies the notification sound according to the predicted time of approaching the event.

In this case, the traveling speed of the vehicle C is detected by the present location detection unit 1b, and the control unit 4 varies the notification sound according to the detected traveling speed. For example, if the traveling speed is a fast speed of between 50 to 100 km/hour, the control unit 4 predicts that the vehicle C will approach the event in a short time and thus a notification sound G1 is reproduced. In contrast, if the traveling speed is below 50 km/hour, the control unit 4 predicts that it will take a long time to approach the event and thus a notification sound G2 is reproduced. It is thereby possible for the user to ascertain whether it will take a long or short time to approach the relevant event. This is effective when the positional relationship between an event and the vehicle C is important, such as in the case of an accident.

Furthermore, although according to the foregoing description notification sounds are made different by changing the kind of notification sound, a configuration may also be adopted whereby notification sounds are made different by changing the reproduction speed or the volume at the time of reproduction or the like. For example, the volume is increased when reproducing an accident event, and the volume is normal when reproducing an event of another kind. Alternatively, in the case of varying notification sounds in accordance with time zones as described above, a configuration may be adopted that uses the notification sound D commonly for a traffic regulation event irrespective of the time zone, and reproduces the notification sound at a normal reproduction speed during the morning, reproduces the notification sound at a speed that is increased by one level when the time zone is the afternoon, and reproduces the notification sound at a speed that is increased by a further one level if the time zone is the evening.

The invention claimed is:

1. A vehicle-mounted device, comprising:
 a communication unit configured to perform wireless communication with a center apparatus via a roadside apparatus;
 a reproduction unit configured to perform audio reproduction;
 a control unit configured to respond to receiving content information from the center apparatus by the communication unit to cause the reproduction unit to perform audio reproduction of a notification sound that notifies that the content information has been received; and a memory unit configured to store a plurality of notification sounds and a table in which one of the plurality of notification sounds has been associated with a classification of the content information, wherein, when causing to perform the audio reproduction of the notification sound, the control unit operates to decide the classification of the content information in accordance with an identifier attached to the received content information, and perform the audio reproduction by using the notification sound associated with the decided classification in the table stored by the memory unit.

2. The vehicle-mounted device according to claim 1, wherein the control unit operates to reproduce the notification sound that varies in accordance with information indicating an event included in the content information.

3. A vehicle-mounted device, comprising:

a communication unit configured to perform wireless communication with a center apparatus via a roadside apparatus;

a reproduction unit configured to perform audio reproduction;

a control unit configured to respond to receiving content information from the center apparatus by the communication unit to cause the reproduction unit to perform audio reproduction of a notification sound that notifies that the content information has been received; and a memory unit configured to store a plurality of notification sounds and a table in which one of the plurality of notification sounds has been associated with a classification of the content information, wherein, when causing to perform the audio reproduction of the notification sound, the control unit operates to decide the classification of the content information in accordance with information indicating an event included in the received content information, and perform the audio reproduction by using the notification sound associated with the decided classification in the table stored by the memory unit.

4. A vehicle-mounted device, comprising:

a communication unit configured to perform wireless communication with a center apparatus via a roadside apparatus;

a reproduction unit configured to perform audio reproduction;

a control unit configured to respond to receiving content information from the center apparatus by the communication unit to cause the reproduction unit to perform audio reproduction of a notification sound that notifies that the content information has been received; and a memory unit configured to store a plurality of notification sounds and a table in which one of the plurality of notification sounds has been associated with a classification of the content information, wherein, when causing to perform the audio reproduction of the notification sound, the control unit operates to analyze text information included in the received content information, decide the classification of the content information in accordance with characters included in the text information, and perform the audio reproduction by using the notification sound associated with the decided classification in the table stored by the memory unit.

5. The vehicle-mounted device according to any one of claims 1 to 4, wherein:

the content information includes reproduction precedence information; and in response to receiving a plurality of pieces of content information by the communication unit, based on precedence information included in the content information, the control unit operates to cause a notification sound for content information with a high precedence to be reproduced first.

6. The vehicle-mounted device according to any one of claims 1 to 4, wherein in response to receiving a plurality of pieces of content information by the communication unit, the control unit operates to cause reproduction of a notification sound that notifies to the effect that a plurality of pieces of content information have been received.

7. The vehicle-mounted device according to any one of claims 1 to 4, wherein the control unit operates to reproduce a notification sound that varies in accordance with a time zone.

8. The vehicle-mounted device according to any one of claims 1 to 4, wherein the control unit operates to reproduce a notification sound that varies in accordance with a traveling speed of a vehicle in which the vehicle-mounted device is installed.

9. The vehicle-mounted device according to any one of claims 1 to 4, wherein the control unit operates to analyze the information indicating an event, calculate a distance from a present location to a location at which the event has occurred, and reproduce a notification sound that varies in accordance with the distance.

* * * * *